(12) United States Patent
Yuan

(10) Patent No.: US 7,481,403 B2
(45) Date of Patent: Jan. 27, 2009

(54) DETACHABLE PANEL STRUCTURE

(75) Inventor: Min Hao Yuan, Miao-Li County (TW)

(73) Assignee: Coretronic Corporation, Chu-Nan (TW)

( * ) Notice: Subject to any disclaimer, the term of this patent is extended or adjusted under 35 U.S.C. 154(b) by 270 days.

(21) Appl. No.: 11/017,784

(22) Filed: Dec. 22, 2004

(65) Prior Publication Data

US 2006/0060728 A1 Mar. 23, 2006

(30) Foreign Application Priority Data

Sep. 22, 2004 (TW) .............................. 93128699 A

(51) Int. Cl.
*A47F 5/00* (2006.01)

(52) U.S. Cl. .................. 248/125.1; 248/305; 248/307; 403/321; 312/265.6; 361/681; 292/42

(58) Field of Classification Search ................ 248/305, 248/307, 306, 310, 346.04, 225.11, 222.11, 248/222.12, 125.2, 225.21, 311.2, 313; 403/321, 403/325, 326, 327, 322.1, 322.4, 324; 312/265.6, 312/7.2; 361/681–683; 292/42, 137, 163, 292/175, 145, 150, 300, 302

See application file for complete search history.

(56) References Cited

U.S. PATENT DOCUMENTS

| 3,356,325 | A | * | 12/1967 | Schnase | 248/187.1 |
| 3,902,932 | A | * | 9/1975 | Gdanski et al. | 248/313 |
| 4,917,416 | A | * | 4/1990 | Westphal et al. | 292/175 |
| 4,929,973 | A | * | 5/1990 | Nakatani | 248/177.1 |
| 4,969,830 | A | * | 11/1990 | Daly et al. | 439/136 |
| 5,033,709 | A | * | 7/1991 | Yuen | 248/313 |
| 5,222,826 | A | * | 6/1993 | Hanke | 403/381 |
| 5,730,406 | A | * | 3/1998 | Chen | 248/223.41 |
| 5,829,997 | A | * | 11/1998 | Okano et al. | 439/310 |
| 6,029,940 | A | * | 2/2000 | Klein | 248/346.04 |
| 6,082,688 | A | * | 7/2000 | Wilson | 248/222.11 |
| 6,229,891 | B1 | * | 5/2001 | Chen | 379/446 |
| 6,229,893 | B1 | * | 5/2001 | Chen | 379/454 |
| 6,341,072 | B1 | * | 1/2002 | Liao | 361/825 |
| 6,594,860 | B2 | * | 7/2003 | Czipri | 16/367 |
| 6,773,172 | B1 | * | 8/2004 | Johnson et al. | 396/428 |
| 2006/0076463 | A1 | * | 4/2006 | Drew | 248/121 |

* cited by examiner

*Primary Examiner*—Kimberly T Wood
(74) *Attorney, Agent, or Firm*—Birch, Stewart, Kolasch & Birch, LLP

(57) ABSTRACT

A panel structure capable of being attached with or detached from a supporting stand mainly comprises a base seat installed at a panel, a base plate installed at the upper end of the supporting stand and a sliding mass capable of being slid in the base seat. Whereby, the base plate in an accepting groove of the base seat can directly be pressed and positioned in the accepting groove through the sliding mass so that the panel can be chosen to be assembled with or detached from the supporting stand depending on the place and the requirement if is practically used.

9 Claims, 10 Drawing Sheets

DETACHABLE PANEL STRUCTURE

BACKGROUND OF THE INVENTION

1. Field of the Invention

The present invention relates to a detachable panel structure, and more particularly to a display panel structure detachable from or attachable with a supporting stand.

2. Description of Related Art

As the technique is being developed, liquid crystal displays have already broadly used as the displays for computers, television and etc.

Please refer to FIGS. 1A and 1B. A combining seat 12 is installed at the rear end of a general liquid crystal panel 11. A supporting stand 13i is locked up on the combining seat 12 by means of pivoting shafts 132 engaged each with an elastic washer 132 and a nut 133 to allow the combining seat to be pivotally installed on the supporting stand 13 such that the liquid crystal panel 11 is fixed on the supporting stand 13. However, because the combination structure of the LCD panel 11 and the supporting stand 13 is fixed, when a user needs to detach the LCD panel 11 freely from the supporting stand 13 or hang the panel 11 on a wall on other vertical surface, he is difficult to detach the panel from the supporting stand. Therefore, the positions for locating the panel 11 are extremely limited, and also because the panel 11 cannot be detached from the stand 13 freely, a box for packaging it always is over large so that the production cost cannot be reduced.

Therefore, how to make a LCD panel easier to be assembled on or detached from a supporting stand is the main topic of the present invention.

SUMMARY OF THE INVENTION

One object of the present invention is to provide a detachable panel structure, enabling a panel to be easy to be assembled on or detached from a supporting stand depending on a practical requirement and use occasion.

Another object of the present invention is to provide a detachable panel structure, enabling the volume of a package box to be able to be reduced effectively and the production cost further to be lowered when a panel is packed.

For attaining to the objects mentioned above, a detachable panel structure according to the present invention comprises a base seat installed on the panel, a sliding mass capable of being slid in the base seat. A base plate accepted in an accepting groove of the base seat can be directly pressed and positioned in the accepting groove by means of the sliding mass movable in the base seat. Whereby, the panel can be easily assembled on or detached from the supporting stand depending on the location and the requirement of its practical use.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1A:
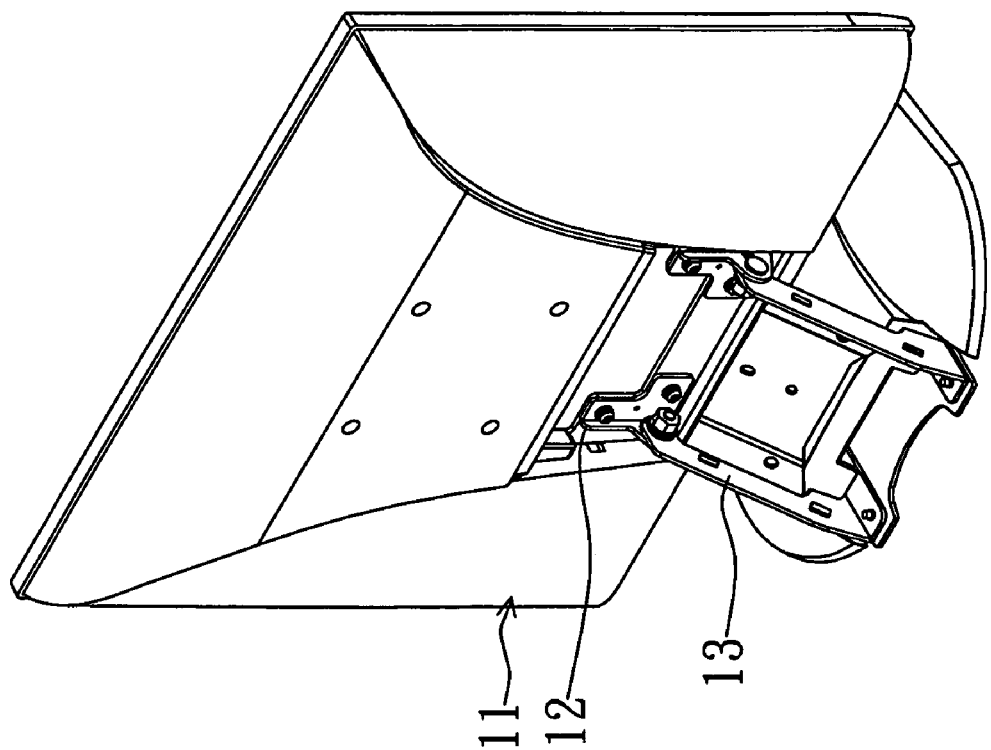
FIG. 1A is a prospective view, showing a supporting stand of the prior art.
Figure 1B:
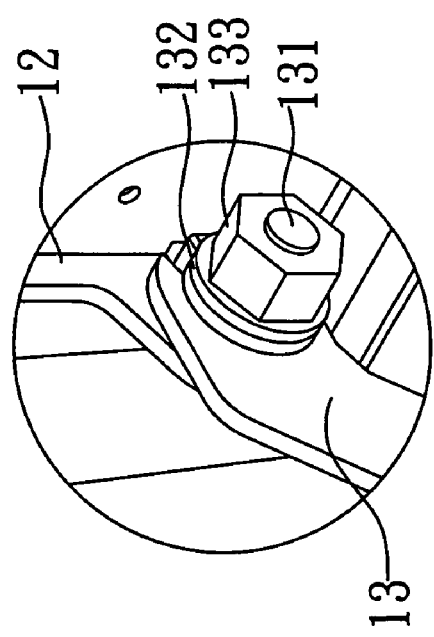
FIG. 1B is a partly enlarged view, showing a supporting stand structure of the prior art.
Figure 2:
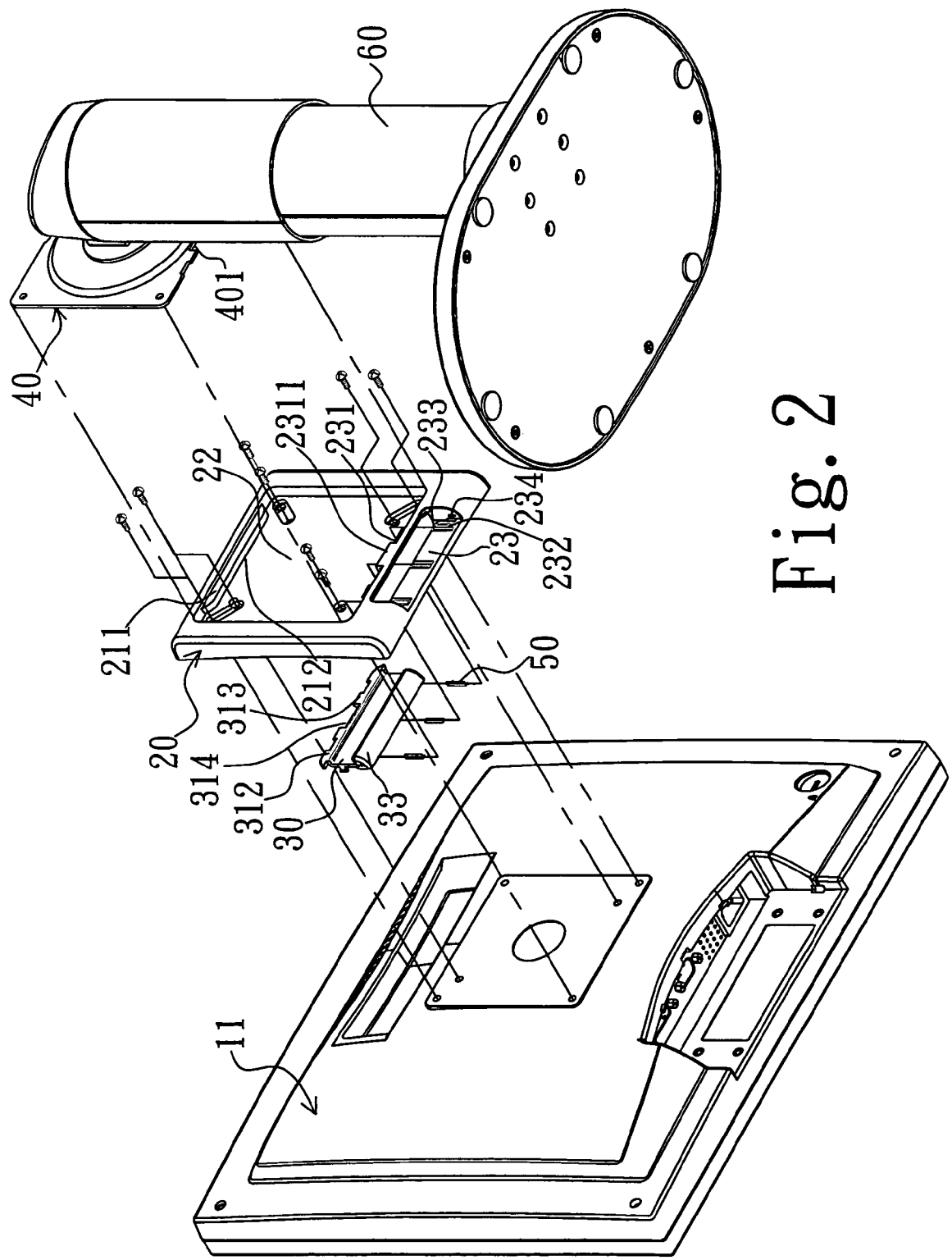
FIG. 2 is an explosive view, showing a detachable panel structure according to the present invention.
Figure 3:
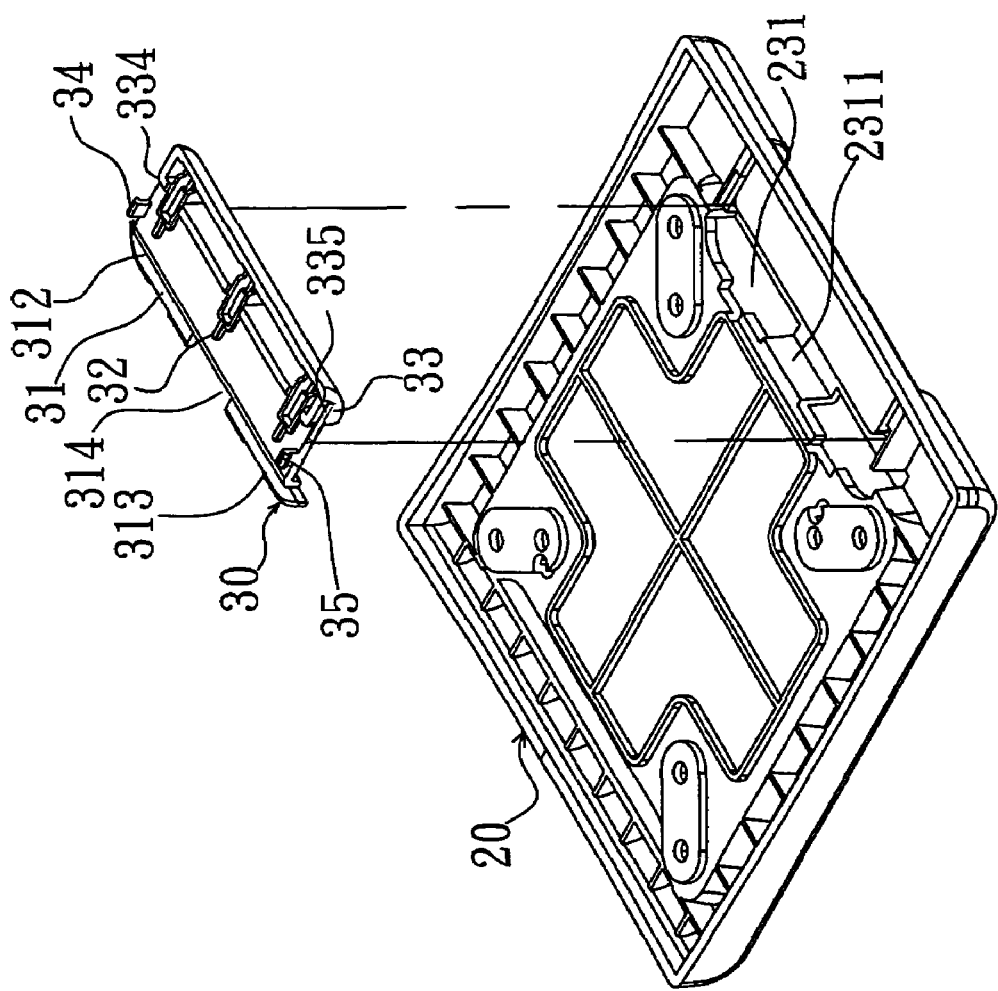
FIG. 3 is a prospective view, showing a base and sliding mass of a detachable panel structure according to the present invention.
Figure 4:
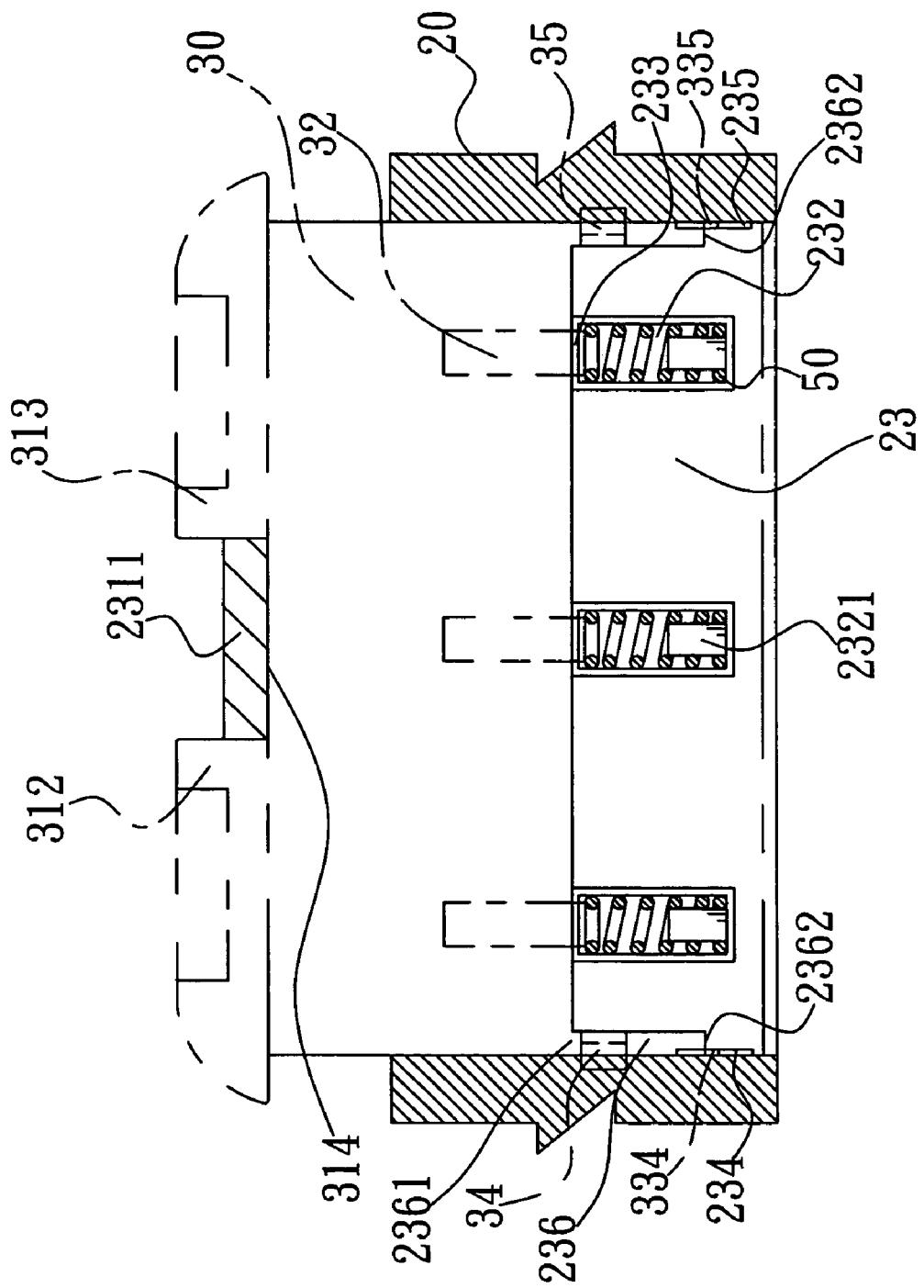
FIG. 4 is a cross sectional view of a base seat in a detachable panel structure according to the present invention.
Figure 5:
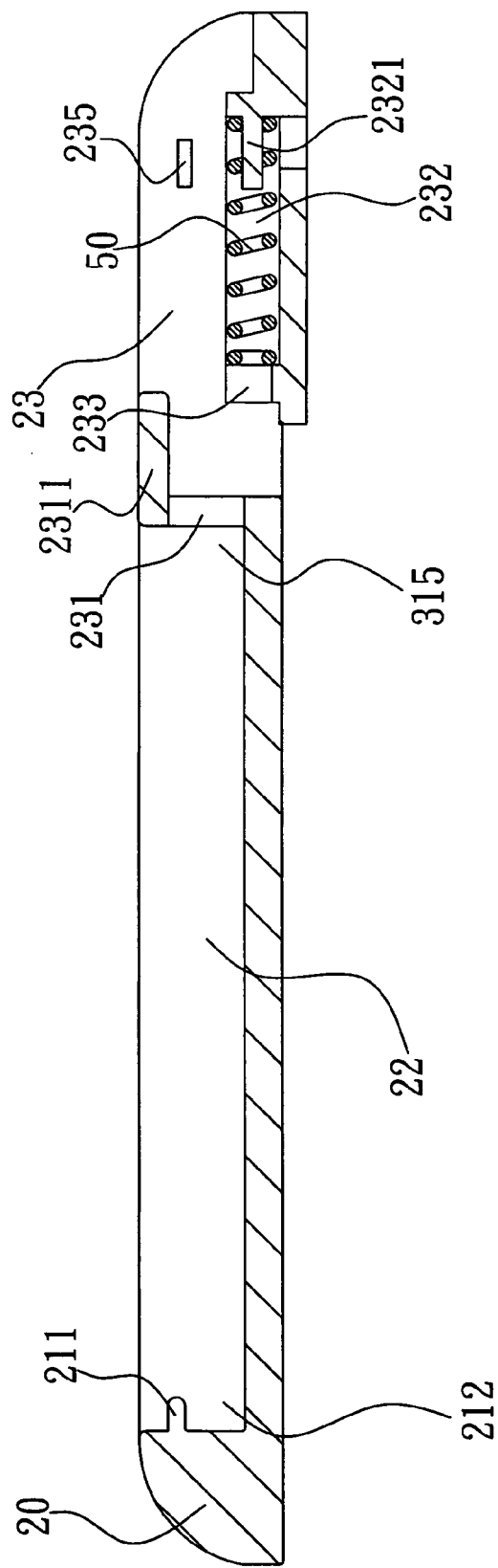
FIG. 5 is a schematic view, showing a sliding mass in a detachable panel structure and a sliding groove in a base seat according to the present invention.
Figure 7:
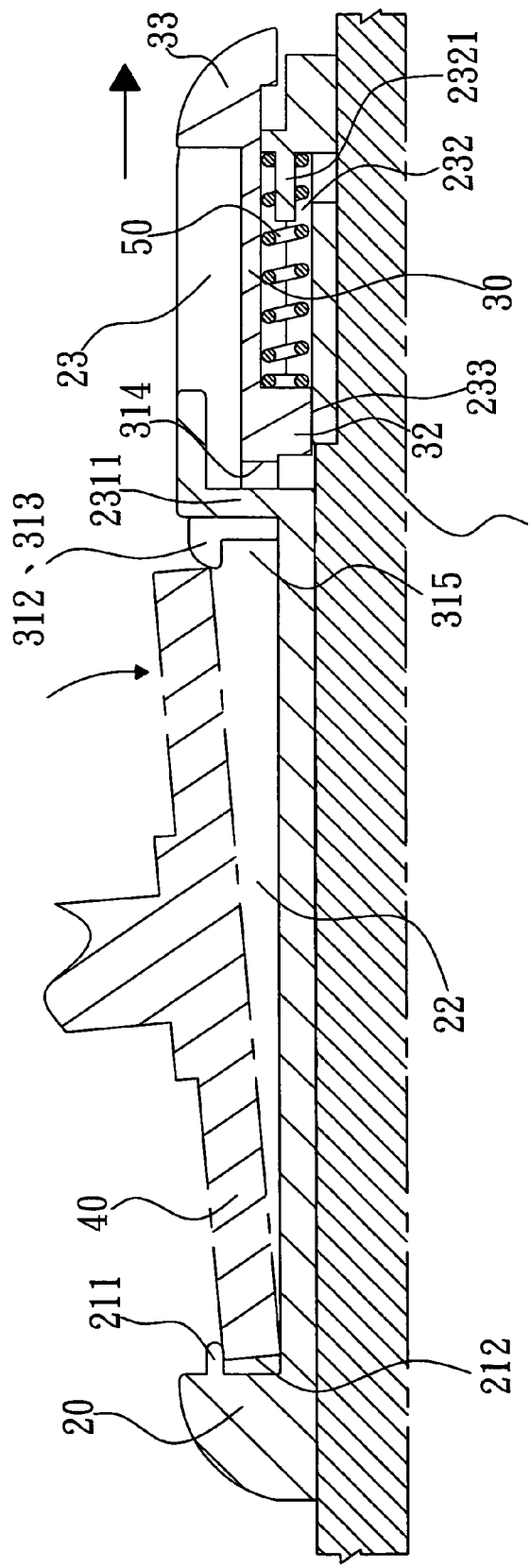
FIG. 7 is a cross sectional view along line A-A in FIG. 6, showing a base plate and base seat before combination according to a preferred embodiment of the present invention.

Please refer to FIGS. 2 to 5. A detachable panel structure mainly comprises a base seat 20, sliding mass 30 and base plate 40, in which the back face (i.e. the surface faced to a display panel 11) is fixed on the back of the display panel 11 by means of fixing elements, such as screws. An accepting groove 22 for accepting the base plate 40 is disposed in the base seat 20 and the opening of the accepting groove 22 is faced to the supporting stand. A fixing raised rib 211 is disposed on an inner side of die accepting groove 22, and a fixing space is formed between the lower surface of die fixing raised rib 211 and the bottom of the accepting groove 22. Besides, a sliding groove 23 on the side of the base seat 20 opposite to the fixing raised rib 21 and an opening 231 is formed between the sliding groove 23 and the accepting groove 22 to allow the sliding groove 23 and the accepting groove 22 to communicate with each other. A barricade plate 2311 is extended at the middle of the upper side of the opening 231 along the direction of the panel 11 and the barricade plate 2311 is connected with the bottom of the accepting groove 22. At least one straight groove 232 is opened at the bottom of the sliding groove 23. A raised column 2321, which can be engaged with an elastic element 50, e.g. a linear spring, is disposed on the rear wall face in the straight groove 232 and extended along the length direction thereof, as FIGS. 4 and 5 show. An indented portion 233 is opened at the upper end of the wall face at the front end of the straight groove 232. Besides, a through groove 236 communicated with the bottom of the base seat 20 is opened at each side of the surface of the through groove 236 and an opening 2361 is disposed at the front end of the through groove 236. Furthermore, the sliding mass 30 is passed through and assembled at the bottom of the sliding groove 23 by means of a communication state existed among the bottom of the base seat 20, the sliding groove 23 and the accepting groove 22. After the assembly, a front end part 31 of the sliding mass 30 is extended out of die opening 231 formed by the sliding groove 23 and the accepting groove 22. Two holding plates 312 and 313 extended toward the center part of the accepting groove 22 are disposed at the upper end of a front end part 31 of the sliding mass 30 and the pitch between the two holding plates 312 and 313 forms a positioning indented portion 314; the holding plates 312 and 313 can he pressed against the two flank sides of the barricade plate 2311 in the opening 231 the positioning indented portion 314, as FIGS. 4 and 5 show. Besides, the lower surfaces of the holding plates 312 and 313 and the bottom of the accepting groove 22 form a fixing space 315, as FIG. 7 shows. Furthermore, long guide rails 32 corresponding to the indented portions 233 opened at the front ends of the straight grooves 232 are projected on the lower surface of the sliding mass 30; the number of the long guide rail 32 is same as the one of the straight grooves 232. The side of the long guide rail 32 corresponding to the straight groove 232 is propped against by an elastic element 50 at the same time to allow the sliding mass 30 to be moved in the sliding groove 23 by means of the spring force of the elastic elements 50 and allow the distance formed between the holding plates 312 and 313 extended from the front end portion 31 of the sliding mass 30 and fixing raised rib 211 can be adjusted, as FIGS. 3 and 7 show, in which a pair of hooks 34 and 35 extended downward respectively from the two flank sides of the sliding mass 30. The hooks 34 and 35 enter through grooves 236 through an opening 2361 at the front end of the through groove 236 when the sliding mass 30 is passed through and combined with the sliding groove 23 and are slid in the through grooves 236 opened at the two ends of the sliding groove 23. Alternatively, long guide notches may be respectively opened on two flank sides or the sliding mass, and a guide piece corresponding to each long guide notch is disposed on each inner flank side of the base seat. Furthermore, a pull bar 33 is extended upward from the rear end of the sliding mass 30 for a user to exert a force to pull. The base plate 40 is installed at the upper end of a supporting stand 60, an indented portion 401 is disposed at one side of the base plate 40 corresponding to the barricade plate 2311 extended from the opening for accepting the barricade plate 2311 of the opening 231.

Figure 6:
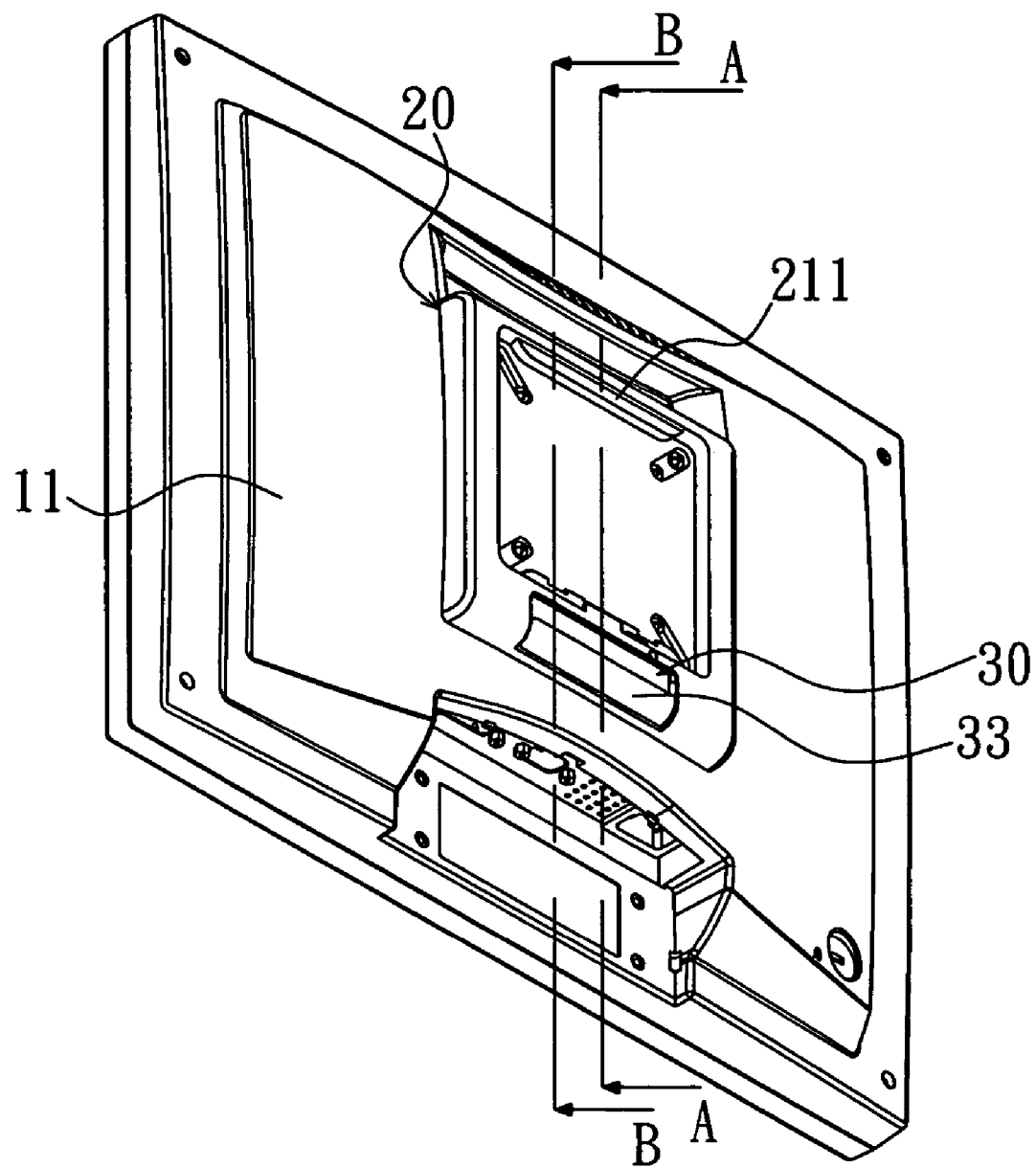
FIG. 6 is a schematic view, showing the combination of a panel and base seat in a detachable panel structure according to the present invention.
Figure 8:
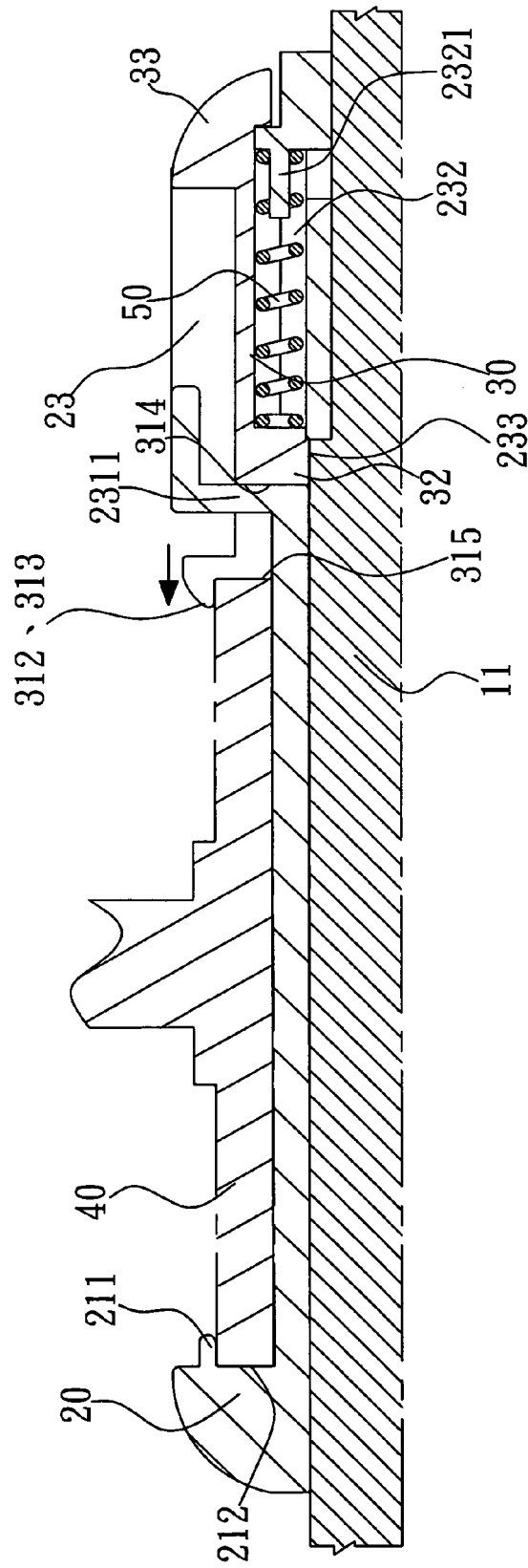
FIG. 8 is a cross sectional view along line A-A in FIG. 6, showing a base plate and base seat in a combination state according to a preferred embodiment of the present invention.

Please FIGS. 6 to 8. Align the fixing space 212 formed by the fixing raised rib 211 on the base seat 20 of the panel 11 with the upper end of the base plate 40 when the panel 11 wants to be assembled on the base plate 40, and then place the upper end of the base plate 40 in the fixing space 212. Exert a pull force on the pull bar 33 at the rear end of the sliding mass 30 so as to allow the long guide rails 32 disposed on the lower surface of the sliding mass 30 to be able to move in the indented portion 233 of the sliding groove 23 to press to deform the elastic elements 50. Meanwhile, the sliding mass 30 is moved on the bottom of the sliding groove 23 along the direction of the pull force and the hooks 34 and 35 extended from the two sides of the sliding mass 30 can be moved and pressed on a rear wall face 2362 of the through groove of the sliding groove 236 to cause the holding plates 312 and 313 at the front end portion 31 of the sliding mass 30 to move together with them; this enlarges the distance between the fixing space 212 and the holding plates 312 and 313. At this time, take the upper end of the base plate 40 placed in the fixing space 212 as an axle center to rotate the base plate 40 an angle, and because the distance between the fixing raised rib 211 and the holding plates 312 and 313 is enlarged, the opposite end (here is the lower end) of the base plate 40 can be accepted in the accepting groove 22 to allow the bottom of the accepting groove 22 to contact with the surface of the base plate 40, as FIG. 8 shows. The pull force can soon be released after the base seat 40 is accepted smoothly and completely in the accepting groove 22 to allow the elastic element 50 in the straight groove 232 of the sliding groove 23 to press against the flank side of a long guiding rail 32 by its own recovering elastic force to cause the sliding mass 30 to be moved reversely. Therefore, the positioning indented portion 314 formed between the two holding plates 312 and 313 at the front end part 31 of the sliding mass 30 can be allowed to recover to its original position and pressed against the flank side of the barricade plate 2311 of the opening 231 and the holding plates 312 and 313 at the front end of the sliding mass 30 just press against the surface at on flank side of the base plate 40 when the positioning indented portion 314 is pressed against the flank side of the barricade plate 2311, as FIG. 8 shows. The both ends of the base plate 40 are pressed against by the fixing raised rib 211 and the holding plates 312 and 313 to allow the base seat 40 to be accepted and fixed in the fixing spaces 212 and 315 respectively formed by the fixing raised rib 211 and the holding plates 312 and 313. Therefore, the deviation or the loosing of the base plate 40 does not happen.

Vice versa, if the panel wants to be detached from the surface of the base plate 40, a pull force is exerted again on the pull bar 33 of the sliding mass 33 to cause the holding plates 312 and 313 disposed at the front end of the sliding mass 30 to be moved together to displace to cause the distance between the fixing raised rib 211 and the holding plates to be enlarged so as to allow the base seat 20 to take the upper end of the base plate 40 in the fixing space 212 as a axle center again to rotate an angle reservedly. And then, the base seat 20 can be withdrawn out of the base plate 40. The pull force can be removed to allow the sliding mass 30 to be recovered back to its original position after the base seat 20 is completely withdrawn out of the base plate 40.

Figure 9:
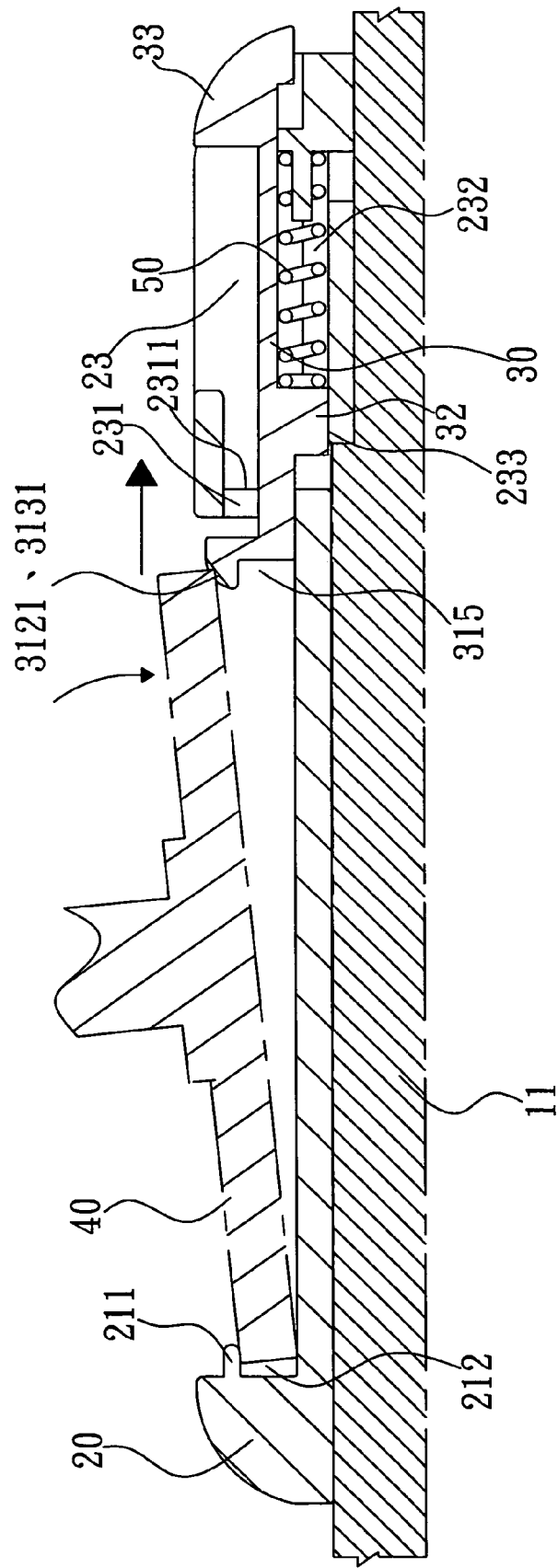
FIG. 9 is a cross sectional view along line B-B in FIG. 6, showing a base plate and base seat before combination according to a preferred embodiment of the present invention.
Figure 10:
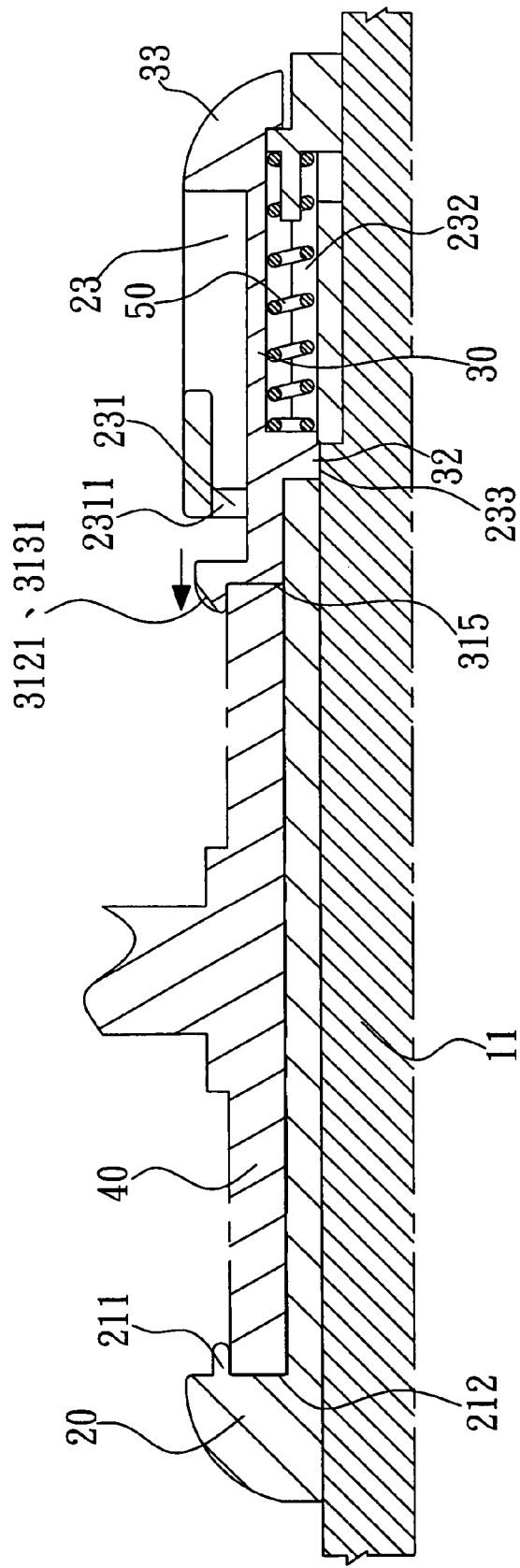
FIG. 10 is a cross sectional view along line B-B in FIG. 6, showing a base plate and base seat in a combination state according to a preferred embodiment of the present invention.

Please refer to FIGS. 9 and 10. A chamfering angle is disposed at the upper edge or a middle section of the upper edge of each of the two holding plates 312 and 313 of the sliding mass 30 relatively to the fixing raised rib 211, as FIG. 4 shows. The inclined faces formed by the chamfering angle are respectively caused to be guide inclined planes 3121 and 3131. When the upper end of the base plate is aligned to the fixing space 212 formed under the fixing raised rib 211, take the upper end of the base plate 40 located in the fixing space as an axle center, rotate the base plate 40 an angle to cause the side edge of the base plate to be pressed against the guide inclined planes 3121 and 3131 disposed at the upper edges of the holding plate 312 and 313. The long guide rails 32 can be displaced in the indented portions 233 of the straight grooves 232 of the sliding groove 23 through the force exerted on the guide inclined planes 3121 and 3131 to press against the elastic elements 50 to cause them to be deformed. Meanwhile, the holding plates 312 and 313 disposed at the front end of the sliding mass 30 are moved together to displace so that the distance between the fixing raised rib 211 and the holding plates 312 and 313 to be enlarged to allow the base plate 40 to be accepted in the accepting groove 22 completely.

After the lower end of the base plate 40 is accepted in the accepting groove 22, the force exerted originally on the guide inclined planes 3121 and 3131 suddenly disappears. At this time, the elastic element 50 is pressed against and exerts a force on the flank side of each long guide rail 32 at the lower surface of the sliding mass 30 to cause the sliding mass 30 to be displaced to recover to its original position. Thereafter, the holding plates 312 and 313 disposed at the front end of the sliding mass 30 can just be pressed against the surface at one side of the base plate 40 to allow the two ends of the base plate 40 to be accepted and fixed in the fixing spaces 212 and 315 respectively formed by the fixing raised rib 211 and the holding plates 312 and 313 by pressing the fixing raised rib and the holding plates 312, 313 respectively on the upper and lower sides of the base plate 40.

As illustrated in FIG. 4, grid pieces 234 and 235 are respectively disposed at two opposite inner flank sides of the sliding groove 23 disposed on the base seat 20 and long guide notches 334 and 335 are respectively opened at the corresponding flank sides of the sliding mass 30. When the sliding mass 30 is displaced by a pull force or the guiding force yielded from the guide inclined planes 3121 and 3131, the wall faces of the long guide notches 334 and 335 are moved on the surfaces of the guide pieces 234 and 235 to allow the sliding mass to be kept in a fixed axial direction to displace so that the lower surface of the sliding mass 30 is able to be kept contacting with the bottom of the sliding groove 23. Whereby, the warp phenomenon of the sliding mass 30 originated from a uneven force does not happen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detachable panel structure for a supporting stand, a base plate being disposed at the upper end of said supporting stand, said panel structure comprising:
    a panel;
    a base seat, installed on the rear part of said panel, an accepting groove being disposed in said base seat, an opening of said accepting groove facing said supporting stand;
    a fixing raised rib, disposed on an inner edge of one flank side of said accepting groove, a positioning space being formed between a lower surface of said fixing raised rib and a bottom of said accepting groove; and
    a sliding mass, slidable and disposable on another flank side of said accepting groove, said another flank side being opposite to said one flank side on which said fixing raised rib is disposed;
    wherein a plurality of holding plates extend from a front end of said sliding mass and a second positioning space is formed between lower surfaces of said holding plates and a bottom of said accepting groove;
    whereby, said base plate is fixed in said accepting groove by pressing against said fixing raised rib and said sliding mass disposed on said accepting groove.

2. The panel structure according to claim 1, wherein a positioning indented portion is formed between said holding plates of said sliding mass.

3. The panel structure according to claim 1, wherein a sliding groove is opened on the surface of the another flank side of base seat relative to said fixing raised rib, an opening is formed to communicate said sliding groove and said accepting groove, said sliding mass is slid to displace on the surface of said sliding groove.

4. The panel structure according to claim 3, wherein a barricade plate connected with a bottom of said accepting groove is extended from the upper end of said opening.

5. The panel structure according to claim 3, wherein through grooves are respectively opened at two sides of said sliding groove, an opening is disposed at a front end of said through grooves, a pair of hooks is extended downward from the two sides of said sliding mass, said hooks are slid in said through groove.

6. The panel structure according to claim 3, wherein at least one straight groove is indented downward at a bottom of said sliding groove, an elastic element is fixed at a rear end of said straight groove and an indented portion is opened at the wall of the front end of said straight groove, a long guide rail is projected upward on a lower surface of said sliding mass corresponding to said indented portion, said long guide rail is slid on said indented portion.

7. The panel structure according to claim 1, wherein long guide notches are respectively opened on two flank sides of said sliding mass, a guide piece corresponding to each said long guide notch is disposed on each inner flank side of said base seat.

8. The panel structure according to claim 1, wherein a pull bar is projected out from a rear end of said sliding mass.

9. The panel structure according to claim 1, wherein at least one guide inclined plane is disposed at a front end of said sliding mass.

\* \* \* \* \*